(12) United States Patent
Liao et al.

US012340773B2

(10) Patent No.: US 12,340,773 B2
(45) Date of Patent: Jun. 24, 2025

(54) DRIVING METHOD FOR DISPLAY PANEL, DISPLAY PANEL, AND DISPLAY DEVICE CONFIGURED WITH TIME FRAME COMPRISING AT LEAST TWO DISPLAY TIME PERIODS AND AT LEAST ONE TOUCH TIME PERIOD WHICH ARE ALTERNATELY CONFIGURED

(71) Applicants: Beijing BOE Display Technology Co., Ltd., Beijing (CN); BOE Technology Group Co., Ltd., Beijing (CN)

(72) Inventors: Yanping Liao, Beijing (CN); Dong Liu, Beijing (CN); Yingmeng Miao, Beijing (CN); Dongchuan Chen, Beijing (CN); Qiujie Su, Beijing (CN); Yinlong Zhang, Beijing (CN); Shulin Yao, Beijing (CN); Xibin Shao, Beijing (CN); Seungmin Lee, Beijing (CN); Xiaofeng Yin, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/580,697

(22) PCT Filed: Jul. 1, 2022

(86) PCT No.: PCT/CN2022/103443
§ 371 (c)(1),
(2) Date: Jan. 19, 2024

(87) PCT Pub. No.: WO2023/005608
PCT Pub. Date: Feb. 2, 2023

(65) Prior Publication Data
US 2024/0339089 A1    Oct. 10, 2024

(30) Foreign Application Priority Data
Jul. 27, 2021    (CN) .......................... 202110849197

(51) Int. Cl.
*G09G 3/36*    (2006.01)
*G06F 3/041*   (2006.01)

(52) U.S. Cl.
CPC ....... *G09G 3/3677* (2013.01); *G06F 3/04166* (2019.05); *G09G 2300/0408* (2013.01);
(Continued)

(58) Field of Classification Search
CPC ......... G09G 3/3677; G09G 2300/0408; G09G 2320/0233; G09G 2310/0286; G09G 2354/00; G06F 3/04166
See application file for complete search history.

(56) References Cited

U.S. PATENT DOCUMENTS

2017/0038898 A1   2/2017   Kim et al.
2017/0178584 A1   6/2017   Ma et al.
(Continued)

FOREIGN PATENT DOCUMENTS

CN   104900211 A   9/2015
CN   106297888 A   9/2015
(Continued)

OTHER PUBLICATIONS

International Search Report, mailed Sep. 19, 2022, from PCT International Application No. PCT/CN2022/103443, 4 pages.

*Primary Examiner* — Afroza Chowdhury
(74) *Attorney, Agent, or Firm* — Workman Nydegger

(57) ABSTRACT

The present disclosure provides a display panel driving method, a display panel and a display device, the method comprising: comprising alternately configure display time periods and touch time periods in one time frame, at least one touch time period being configured, and at least two display time periods being configured; sequentially scanning in each display time period a portion of gate lines in a display panel; and pausing in each touch time period the scanning of all gate lines, and performing touch recognition, wherein in a display time period adjacent to a touch time period, level compensation is performed on a gate line to be compensated, and the gate line to be compensated is at least one gate line that starts to scan in the display time period adjacent to the touch time period.

20 Claims, 10 Drawing Sheets

(52) U.S. Cl.
CPC .............. *G09G 2310/0286* (2013.01); *G09G 2320/0233* (2013.01); *G09G 2354/00* (2013.01)

(56) References Cited

U.S. PATENT DOCUMENTS

| | | |
|---|---|---|
| 2017/0235406 A1 | 8/2017 | Su et al. |
| 2018/0121023 A1* | 5/2018 | Kim .................... G06F 3/04184 |
| 2019/0129562 A1 | 5/2019 | Li et al. |
| 2019/0361586 A1* | 11/2019 | Weng ................. G06F 3/04164 |
| 2019/0371236 A1 | 12/2019 | Sakai |
| 2021/0165548 A1* | 6/2021 | Zhang ................... G06F 3/0446 |
| 2021/0191547 A1 | 6/2021 | Hsu et al. |

FOREIGN PATENT DOCUMENTS

| | | |
|---|---|---|
| CN | 105528988 A | 4/2016 |
| CN | 106325633 A | 1/2017 |
| CN | 106328074 A | 1/2017 |
| CN | 106448558 A | 2/2017 |
| CN | 107731170 A | 2/2018 |
| CN | 109213357 A | 1/2019 |
| CN | 111078051 A | 4/2020 |
| CN | 111508402 A | 8/2020 |
| CN | 112527150 A | 3/2021 |
| WO | 2018173244 A1 | 9/2018 |

\* cited by examiner

DRIVING METHOD FOR DISPLAY PANEL, DISPLAY PANEL, AND DISPLAY DEVICE CONFIGURED WITH TIME FRAME COMPRISING AT LEAST TWO DISPLAY TIME PERIODS AND AT LEAST ONE TOUCH TIME PERIOD WHICH ARE ALTERNATELY CONFIGURED

CROSS-REFERENCE TO RELATED APPLICATIONS

The present application is a National Stage of International Application No. PCT/CN2022/103443, filed Jul. 1, 2022, which claims the priority to Chinese patent application No. 202110849197.6 filed to China National Intellectual Property Administration on Jul. 27, 2021, of which the entire contents are incorporated herein by reference.

TECHNICAL FIELD

The present disclosure relates to the technical field of display, in particular to a display panel driving method, a display panel and a display device.

BACKGROUND

Full in cell (FIC) touch, as a novel touch technology, has advantages of achieving good touch effect, low cost, and light weight, and being suitable for making narrow bezel products, and is expected to become a new application scenario for the development of a next product form in displays (e.g., TV) and electronic whiteboards.

The full in cell touch technology includes an active pen (e.g., LHB) touch technology and a passive pen (e.g., LVB) touch technology, wherein, compared to the passive pen touch technology, the active pen touch technology has better touch effect and high touch sensitivity, and can perceive the thickness and writing force of a touch pen point. Therefore, the active pen touch technology has better user experience and application scenarios.

Driving modes of the active pen touch technology and the passive pen touch technology are different: as shown in FIG. 1, a display panel using the active pen touch technology alternates between touch and display in a time sharing mode within one time frame, wherein a touch time period is called a "pit", and within the pit, a clock signal (Clk) is at a low level; and as shown in FIG. 2, a display panel using the passive pen touch technology displays first within one time frame, followed by touch.

SUMMARY

A driving method for a display panel, a display panel and a display device provided by embodiments of the present disclosure have the following specific solutions.

In one aspect, an embodiment of the present disclosure provides a driving method for a display panel, wherein one time frame comprises at least two display time periods and at least one touch time period which are alternately configured, and the method includes: in each display time period, sequentially scanning a portion of gate lines in the display panel; and in each touch time period, holding the scanning for all the gate lines, and performing touch recognition, wherein in a display time period which follows and is adjacent to a touch time period, level compensation is performed on a to-be-compensated gate line, and the to-be-compensated gate line is at least one gate line that starts to be scanned in the display time period which follows and is adjacent to the touch time period.

Optionally, in the above driving method provided by the embodiment of the present disclosure, the performing the level compensation on the to-be-compensated gate line includes: providing a gate driving signal containing level compensation for the to-be-compensated gate line through a gate drive circuit.

Optionally, in the above driving method provided by the embodiment of the present disclosure, the providing the gate driving signal containing the level compensation for the to-be-compensated gate line through the gate drive circuit includes: loading a first clock signal containing the level compensation onto the gate drive circuit to cause that the gate drive circuit generates the gate driving signal containing the level compensation according to the first clock signal containing the level compensation.

Optionally, in the above driving method provided by the embodiment of the present disclosure, loading the first clock signal containing the level compensation onto the gate drive circuit includes: loading the level compensation onto the gate drive circuit within 1% to 100% of a pulse width time of an effective level pulse of the first clock signal, and providing the first clock signal after loading the level compensation to the gate drive circuit.

Optionally, in the above driving method provided by the embodiment of the present disclosure, a voltage value of the effective level pulse of the first clock signal after loading the level compensation is greater than a voltage value of an effective level pulse of at least one last second clock signal within a display time period before the touch time period.

Optionally, in the above driving method provided by the embodiment of the present disclosure, a difference between the voltage value of the effective level pulse of the first clock signal after loading the level compensation and the voltage value of the effective level pulse of the second clock signal is 0.25% to 7.5% of a voltage value of the effective level pulse of the first clock signal before loading the level compensation.

Optionally, in the above driving method provided by the embodiment of the present disclosure, the voltage value of the effective level pulse of the first clock signal after loading the level compensation is between 27 V and 40 V.

Optionally, in the above driving method provided by the embodiment of the present disclosure, loading the first clock signal containing the level compensation onto the gate drive circuit includes: loading the level compensation onto the gate drive circuit within 1% to 100% of a pulse interval time between effective level pulses of the first clock signal, and providing the first clock signal after loading the level compensation to the gate drive circuit.

Optionally, in the above driving method provided by the embodiment of the present disclosure, a voltage value of the first clock signal after loading the level compensation within the pulse interval time is less than a voltage value, within the pulse interval time, of at least one last second clock signal within a display time period before the touch time period.

Optionally, in the above driving method provided by the embodiment of the present disclosure, a difference between the voltage value of the first clock signal after loading the level compensation within the pulse interval time and the voltage value of the second clock signal within the pulse interval time is 10% to 60% of a voltage value of the first clock signal before compensating before loading the level compensation within the pulse interval time.

Optionally, in the above driving method provided by the embodiment of the present disclosure, the voltage value of the first clock signal after loading the level compensation within the pulse interval time is between −4 V and −20 V.

Optionally, in the above driving method provided by the embodiment of the present disclosure, the gate drive circuit includes a plurality of shift registers arranged in a cascade mode, input signal ends of a first stage of shift register to an $N^{th}$ stage of shift register are connected with a frame trigger signal end, except for the first stage of shift register to the $N^{th}$ stage of shift register, input signal ends of the rest stages of shift registers are respectively connected with second output signal ends of shift registers with an N-stage interval thereon, a first output signal end of each stage of shift register is correspondingly electrically connected with one gate line, 2N stages of shift registers which are adjacent to one another are correspondingly electrically connected with 2N clock signal lines respectively, and N is a positive integer; and in each display time period, sequentially scanning the portion of corresponding gate lines includes: in each display time period, sequentially scanning the gate lines corresponding to the different clock signal lines.

Optionally, in the above driving method provided by the embodiment of the present disclosure, loading the first clock signal containing the level compensation onto the gate drive circuit includes: loading the first clock signal containing the level compensation onto the first N shift registers that start working through the first N clock signal lines that start working.

Optionally, in the above driving method provided by the embodiment of the present disclosure, the gate drive circuit includes a plurality of shift registers arranged in a cascade mode, input signal ends of a first stage of shift register to an $N^{th}$ stage of shift register are connected with a frame trigger signal end, except for the first stage of shift register to the $N^{th}$ stage of shift register, input signal ends of the rest stages of shift registers are respectively connected with second output signal ends of shift registers with an N-stage interval thereon, a first output signal end of each stage of shift register is correspondingly electrically connected with one gate line, 2N stage of shift register which are adjacent to one another are correspondingly electrically connected with 2N clock signal lines respectively, and N is a positive integer; and in each display time period, sequentially scanning the portion of corresponding gate lines includes: in each display time period, sequentially scanning the gate line corresponding to the same clock signal line.

Optionally, in the above driving method provided by the embodiment of the present disclosure, loading the first clock signal containing the level compensation onto the gate drive circuit includes: loading the first clock signal containing the level compensation onto the first N shift registers that start working through N clock signal lines with fixed serial numbers.

Optionally, in the above driving method provided by the embodiment of the present disclosure, loading the first clock signal containing the level compensation onto the gate drive circuit includes: loading the first clock signal containing the level compensation onto the first N shift registers that start working through N clock signal lines electrically and respectively connected with shift registers with which the first N shift registers that start working are upward cascaded.

Optionally, in the above driving method provided by the embodiment of the present disclosure, performing the level compensation on the to-be-compensated gate line includes: providing a gate driving signal containing level compensation for the to-be-compensated gate line through a chip on film.

Optionally, in the above driving method provided by the embodiment of the present disclosure, the providing the gate driving signal containing the level compensation for the to-be-compensated gate line through the chip on film includes: loading the level compensation within 1% to 100% of a pulse width time of a first effective level pulse provided by the chip on film, and using the first effective level pulse after the level compensation as the gate driving signal.

Optionally, in the above driving method provided by the embodiment of the present disclosure, a voltage value of the first effective level pulse after loading the level compensation is less than a voltage value of at least one last second effective level pulse within a display time period before the touch time period.

Optionally, in the above driving method provided by the embodiment of the present disclosure, a difference between the voltage value of the second effective level pulse and the voltage value of the first effective level pulse after loading the level compensation is 1.25% to 20% of a voltage value of the first effective level pulse before loading the level compensation.

Optionally, in the above driving method provided by the embodiment of the present disclosure, the voltage value of the first effective level pulse after loading the level compensation is between 20 V and 40 V.

In another aspect, an embodiment of the present disclosure further provides a display panel, driven by using the driving method described in any of the above.

Optionally, the above display panel provided by the embodiment of the present disclosure includes a gate drive circuit, a plurality of gate lines, and 2N clock signal lines, wherein the gate drive circuit includes a plurality of shift registers arranged in a cascade mode, input signal ends of a first stage of shift register to an $N^{th}$ stage of shift register are connected with a frame trigger signal end, except for the first stage of shift register to the $N^{th}$ stage of shift register, input signal ends of the rest stages of shift registers are respectively connected with second output signal ends of a shift registers with an N-stage interval thereon, a first output signal end of each stage of shift register is correspondingly electrically connected with one gate line, 2N stage of shift register which are adjacent to one another are correspondingly electrically connected with 2N clock signal lines respectively, and N is a positive integer.

Optionally, in the above display panel provided by the embodiment of the present disclosure, each shift register includes: an input transistor, a reset transistor, a first output transistor, a second output transistor, a capacitor, and a control circuit; a gate electrode and a first electrode of the input transistor are electrically connected with an input signal end, and a second electrode of the input transistor is electrically connected with a pull-up node; a gate electrode of the reset transistor is electrically connected with a reset signal end, a first electrode of the reset transistor is electrically connected with a power supply signal end, and a second electrode of the reset transistor is electrically connected with the pull-up node; a gate electrode of the first output transistor is electrically connected with the pull-up node, a first electrode of the first output transistor is electrically connected with a clock signal line, a second electrode of the first output transistor is electrically connected with a first output signal end, and the first output signal end is electrically connected with the gate line; the capacitor is connected between the gate electrode of the first output transistor and the first output signal end; a gate electrode of the second output transistor is electrically connected with the pull-up node, a first electrode of the second output transistor is electrically connected with the clock signal line, a second electrode of the second output transistor is electrically connected with a second output signal end, and the second output signal end is electrically connected with an input signal end of a shift register with an N-level interval thereunder; and the control circuit is electrically connected with the pull-up node, the first output signal end, the second output signal end and a control signal end respectively, and the control circuit is configured to control levels of the pull-up node, the first output signal end and the second output signal end in response to a signal of the control signal end.

Optionally, the above display panel provided by the embodiment of the present disclosure includes a chip on film and a plurality of gate lines, and the chip on film includes a plurality of terminals correspondingly electrically connected with the gate line, respectively.

In another aspect, an embodiment of the present disclosure provides a display device, including the display panel described in any of the above.

DETAILED DESCRIPTION

Figure 1:
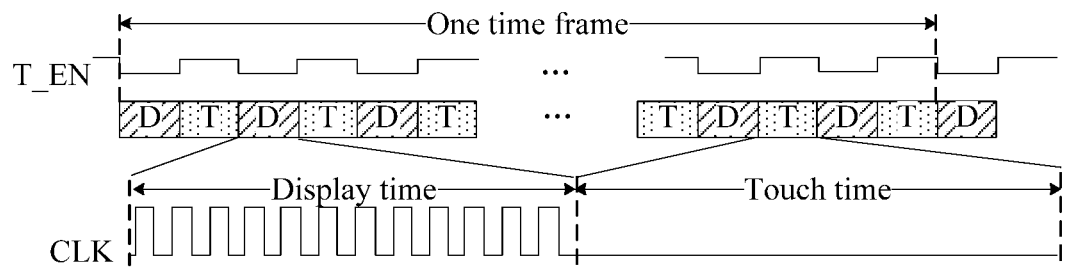
FIG. 1 shows a working timing diagram of an active pen touch technology in the related art.
Figure 2:
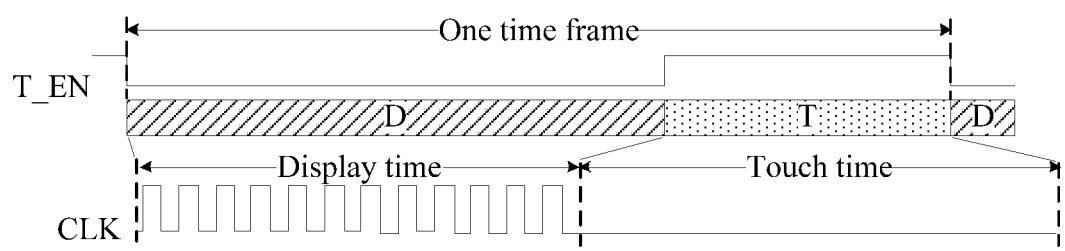
FIG. 2 shows a working timing diagram of a passive pen touch technology in the related art.

In order to make objectives, technical solutions and advantages of embodiments of the present disclosure clearer, the technical solutions of the embodiments of the present disclosure will be described below clearly and completely with reference to accompanying drawings of the embodiments of the present disclosure. It should be noted that sizes and shapes of all graphs in the accompanying drawings do not reflect the true scale, and only intend to illustrate the content of the present disclosure. The same or similar reference numbers represent the same or similar elements or elements with the same or similar functions from beginning to end.

Unless otherwise defined, the technical or scientific terms used here shall have the usual meanings understood by a person of ordinary skill in the art to which the present disclosure belongs. The words "including" or "containing", and the like used in the specification and claims of the present disclosure, mean that an element or item preceding the word covers an element or item listed after the word and the equivalent thereof, without excluding other elements or items. The words "inner", "outer", "up", "down", and the like are only used to indicate the relative positional relationship. When the absolute position of the described object changes, the relative positional relationship may also change accordingly.

When a display panel uses an active pen touch technology, due to alternate configuration of display time periods and touch time periods, scanning holding will be performed when a certain row of pixels is scanned, and touch recognition is performed. Then, the scanning will continue from the row of pixels for which the scanning is held. In this way, the display and touch are alternately driven for multiple times until one frame of image is completely displayed. For example, when a display panel with a 4K resolution uses the active pen touch technology, one time frame will be divided into 16 display time periods and 16 touch time periods. Therefore, every 135 rows of pixels scanned will stop to perform touch. After the first touch is completed, the 136th row of pixels will be scanned again, and this cycle will continue until 2160 rows of pixels are completely scanned.

However, since the holding time of pixel rows charged before the touch time period and the holding time of pixel rows charged after the touch time period are different, the degrees of electric leakage of the two are different, which causes that display brightness of the two is inconsistent, and horizontal stripes or poor horizontal blocks will appear on display images.

In order to at least solve the above technical problem existing in the related art, an embodiment of the present disclosure provides a driving method for a display panel, which may include the following steps.

Alternately configured at least two display time periods and at least one touch time period in one time frame; a portion of gate lines in the display panel are sequentially scanned in each display time period; and in each touch time period, the scanning for all the gate lines is held and touch recognition is performed, wherein in a display time period which follows and is adjacent to a touch time period, level compensation is performed on a to-be-compensated gate line to ensure uniform brightness of display images, and the to-be-compensated gate line is at least one gate line that starts to be scanned in the display time period which follows and is adjacent to the touch time period.

In the above driving method provided by the embodiment of the present disclosure, level compensation is performed on at least one to-be-compensated gate line that starts to be scanned in a process of sequentially scanning the gate lines within the display time period after the touch time period, such that levels on the gate lines scanned within the display time period before the touch time period and levels on the gate lines scanned within the display time period after the touch time period are roughly the same, thereby ensuring the brightness uniformity of the display image, effectively relieving the horizontal stripes or poor blocks of the display image, and enhancing user experience.

It should be noted that in the embodiments provided by the present disclosure, due to limitation in a process condition or influence of other factors such as measurement, the above "roughly" may be completely equivalent or there may be some deviations. Therefore, as long as a "rough" relationship between the above features meets an allowable error (e.g., a 5% fluctuation), which belongs to a protection scope of the present disclosure.

In some embodiments, in the above driving method provided by the embodiment of the present disclosure, performing level compensation on the to-be-compensated gate line may be specifically providing a gate driving signal containing the level compensation for the to-be-compensated gate line through a gate drive circuit (e.g., gate on array, GOA). The use of a GOA driving technology may eliminate the need for a chip on film (COF), reduce production costs, and facilitate the design of narrow bezels for the display panels, thereby enhancing product competitiveness.

Figure 3:
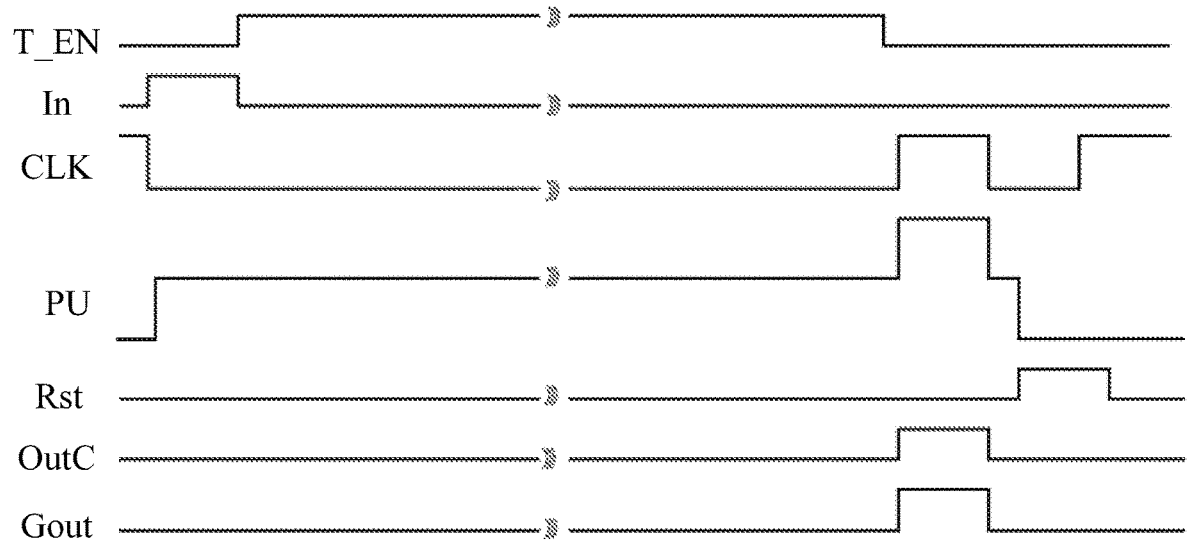
FIG. 3 is a schematic diagram of an ideal waveform of a voltage at each node after a shift register holds scanning provided by embodiments of the present disclosure.

In some embodiments, as shown in FIG. 3, a shift register of the gate drive circuit needs to hold scanning each time it enters the touch time period (that is, a touch signal T_EN is a high level). During this touch time period, a clock signal CLK is a low level, a pull-up node PU in the shift register is a high level, and the pull-up node PU needs to maintain the high level throughout this touch time period.

Figure 4:
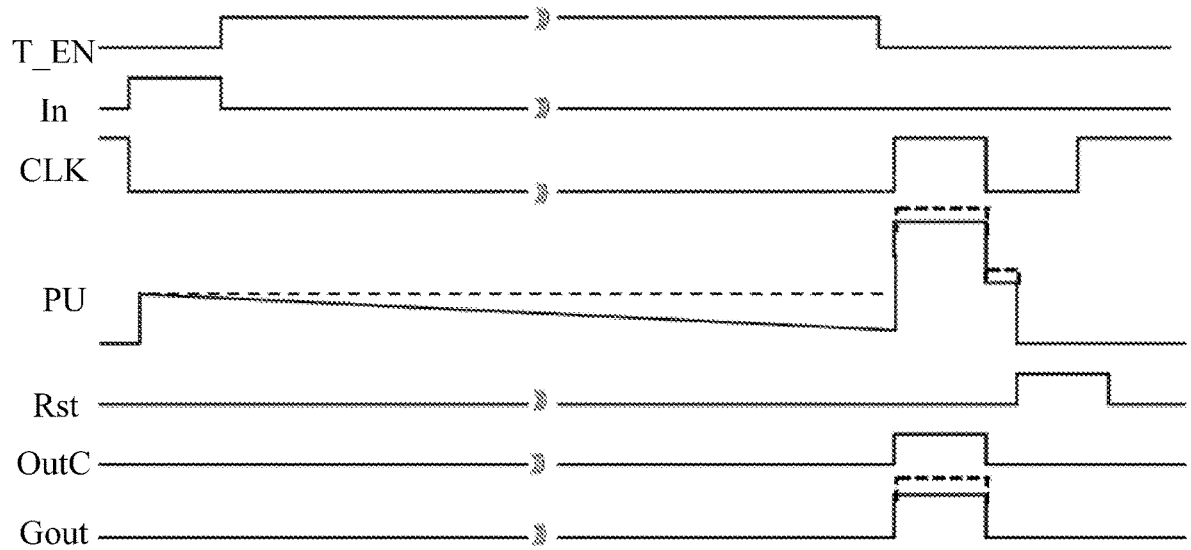
FIG. 4 is a schematic diagram of comparison between an ideal waveform and an actual waveform of a voltage at each node after a shift register holds scanning provided by embodiments of the present disclosure.

However, as shown in FIG. 4, during the touch time period, due to electric leakage of a transistor that affects the level of the pull-up node PU, the level of the pull-up node PU will decrease with the increase of a holding time. Specifically, dashed lines in FIG. 4 represent an ideal waveform of the pull-up node PU and an ideal waveform of a first output signal end Gout, while solid lines represent an actual waveform of the pull-up node PU and an actual waveform of the first output signal end Gout. Therefore, when restarting the scanning, a turned-on degree of an output transistor controlled by the level of the pull-up node PU is not the same, causing a difference in amplitude and delay between an effective level pulse of the clock signal CLK provided by the output transistor for the first row of pixels that restarts to be scanned and an effective level pulse of the clock signal CLK loaded on other pixel rows, resulting in deterioration of a charging effect of the first row of pixels that restarts to be scanned, and ultimately leading to dark lines (i.e., horizontal stripes) appearing on the display images.

Based on this, in order to relieve the poor horizontal stripes, in the above driving method provided by the embodiment of the present disclosure, the gate driving signal containing the level compensation is provided for the to-be-compensated gate line through the gate drive circuit. Specifically, the gate drive circuit may be loaded with a clock signal CLK containing the level compensation, such that the gate drive circuit generates the gate driving signal containing the level compensation according to the clock signal CLK containing the level compensation.

Figure 5:
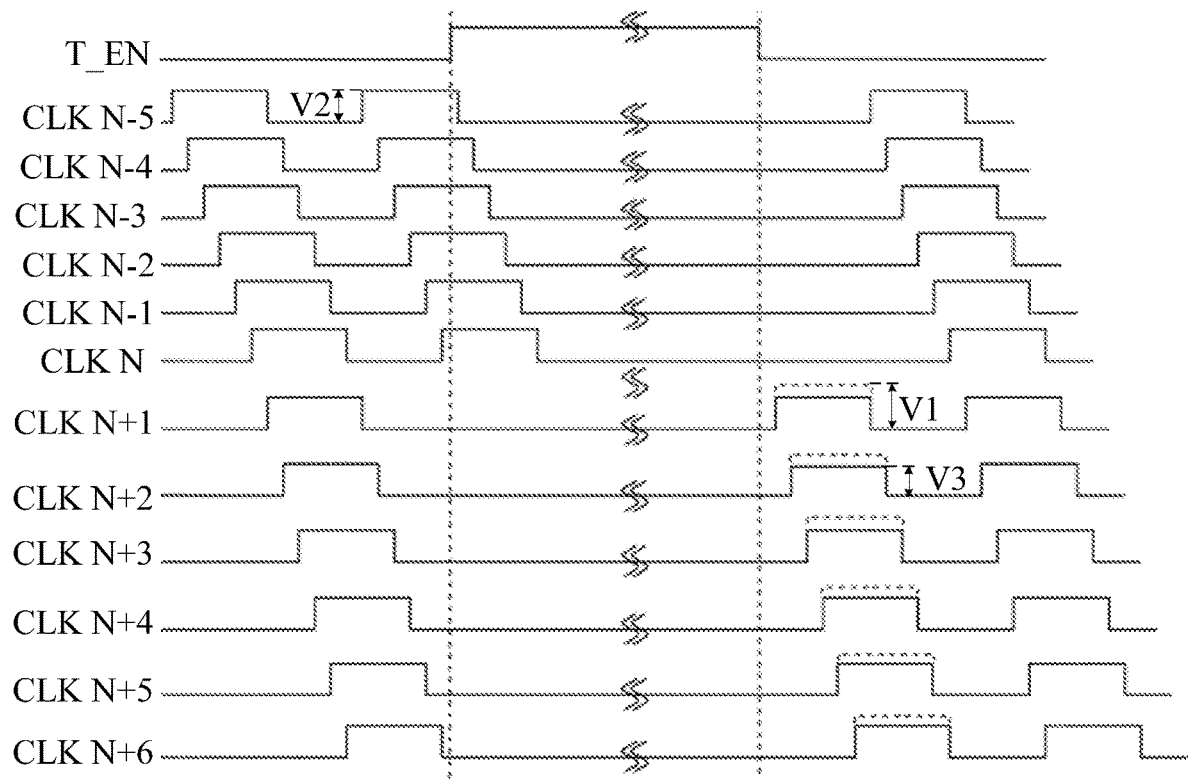
FIG. 5 is a schematic diagram of using a gate drive circuit to perform level compensation on a to-be-compensated gate line provided by embodiments of the present disclosure.
Figure 6:
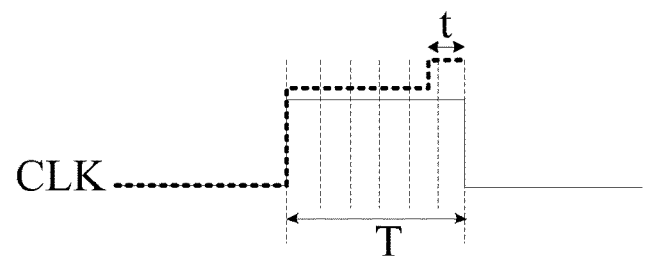
FIG. 6 is an enlarged schematic diagram of effective level pulse compensation for a clock signal in FIG. 5.

Exemplarily, as shown in FIG. 5 and FIG. 6, loading a first clock signal containing the level compensation onto the gate drive circuit may specifically be achieved through the following modes.

The level compensation is loaded within 1% to 100% of a pulse width time of an effective level pulse of the first clock signal, and the first clock signal after loading the level compensation is provided to the gate drive circuit. Specifically, FIG. 5 shows loading the level compensation within 100% of the pulse width time of the effective level pulse of the first clock signal CLK N+1 to N+6. FIG. 6 shows loading the level compensation within approximately 17% of the pulse width time of the effective level pulse of the clock signal CLK, that is, a ratio of a time t for loading the compensation level to the pulse width time T is approximately 17%. During specific implementation, the length of compensation time may be selected according to the severity degree of the horizontal stripes and the voltage value after compensation. In some embodiments, when the voltage value after compensation is fixed, the more severe the horizontal stripes, the longer the compensation time, for example, the compensation time may account for more than 50% of the pulse width time. On the contrary, when the voltage value after compensation is fixed, the lighter the horizontal stripes, the shorter the compensation time, for example, the compensation time may account for less than 50% of the pulse width time.

In some embodiments, as shown in FIG. 5, a voltage value V1 of the effective level pulse of the first clock signal CLK N+1 to N+6 after loading the level compensation may be greater than a voltage value V2 of an effective level pulse of at least one last second clock signal CLK N−5 to N within a display time period before the touch time period. Optionally, a difference (V1−V2) between the voltage value V1 of the effective level pulse of the first clock signal CLK N+1 to N+6 after loading the level compensation and the voltage value V2 of the effective level pulse of the second clock signal CLK N−5 to N may be 0.25%-7.5% of a voltage value V3 of the effective level pulse of the first clock signal CLK N+1 to N+6 before compensation, that is, a value of (V1−V2)/V3 is in a range from 0.25% to 7.5%. Generally, the voltage value V3 of the effective level pulse of the first clock signal CLK N+1 to N+6 before compensation may be equal to the voltage value V2 of the effective level pulse of the second clock signal CLK N−5 to N, that is, V3=V2.

During specific implementation, the voltage value V1 of the effective level pulse of the first clock signal CLK N+1 to N+6 after loading the level compensation may be selected according to the severity degree of the horizontal stripes and the length of the compensation time. In some embodiments, when the compensation time is fixed, the more severe the horizontal stripes, the larger the voltage value V1 of the effective level pulse of the first clock signal CLK N+1 to N+6 after loading the level compensation, correspondingly, the difference (V1−V2) between the voltage value V1 of the effective level pulse of the first clock signal CLK N+1 to N+6 after loading the level compensation and the voltage value V2 of the effective level pulse of the second clock signal CLK N−5 to N is the larger, for example, the value of (V1−V2)/V3 may be in a range from 2.5% to 7.5%. On the contrary, when the compensation time is fixed, the lighter the horizontal stripes, the less the voltage value V1 of the effective level pulse of the first clock signal CLK N+1 to N+6 after loading the level compensation, correspondingly, the difference (V1−V2) between the voltage value V1 of the effective level pulse of the first clock signal CLK N+1 to N+6 after loading the level compensation and the voltage value V2 of the effective level pulse of the second clock signal CLK N−5 to N is smaller, for example, the value of (V1−V2)/V3 may be in a range from 0.25% to 2.5%.

In some embodiments, the value of the voltage value V1 of the effective level pulse of the clock signal CLK N+1 to N+6 after loading the level compensation may be in a range from 27 V to 40 V. For example, the voltage value V3 of the effective level pulse of the clock signal CLK N+1 to N+6 before compensation is 32 V, preferably, the voltage value V1 of the effective level pulse of the clock signal CLK N+1 to N+6 after compensation is in a range from 32.1 V to 34 V.

It can be seen from the above content that the amplitude of the effective level pulse after performing the level compensation on the effective level pulse of the first clock signal increases. On the one hand, the gate driving signal output by an output transistor in the gate drive circuit is increased. On the other hand, a level of a pull-up node PU may be pulled up through a bootstrap effect of a capacitor, thereby increasing a turned-on degree of the output transistor and further increasing the gate driving signal provided by the output transistor. Under the effect of the above two factors, dark lines before compensation in the display images increase in brightness after compensation, thereby effectively relieving the poor horizontal stripes in the images.

In some embodiments, a falling edge of the effective level pulse contained in the clock signal is too large, which prevents the timely pulling down of the level of the pull-up node PU and affects the timely turnoff of the output transistor. This may cause a data signal of a pixel row that should have stopped scanning to be written to each other with a data signal of the next row of pixel row scanned, resulting in poor serial display.

Based on this, in order to relieve the poor serial display, in the above driving method provided by the embodiment of the present disclosure, loading the first clock signal containing the level compensation onto the gate drive circuit may specifically be achieved through the following modes.

Figure 7:
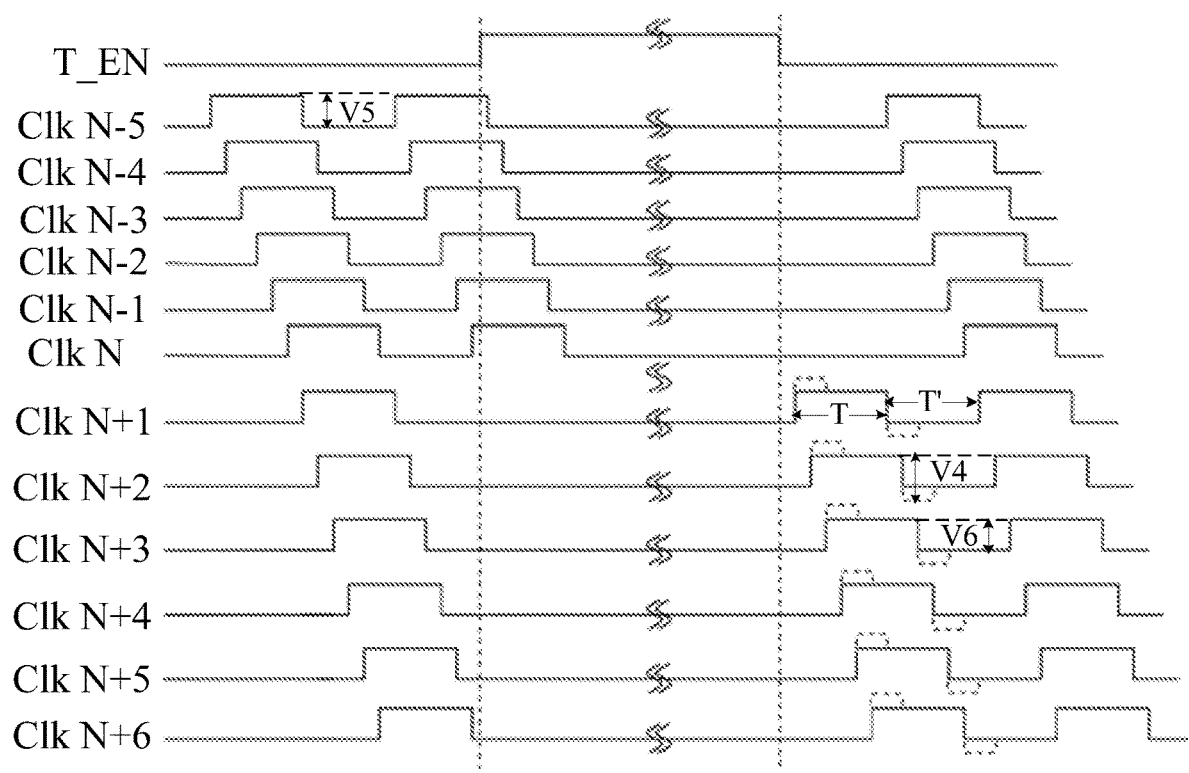
FIG. 7 is another schematic diagram of using a gate drive circuit to perform level compensation on a to-be-compensated gate line provided by embodiments of the present disclosure.

As shown in FIG. 7, the level compensation may be loaded onto the first clock signal within 1% to 100% of a pulse interval time T' between effective level pulses of the first clock signal, and the first clock signal after loading the level compensation is provided to the gate drive circuit. During specific implementation, the length of compensation time may be selected according to the severity degree of the serial display and the voltage value after compensation. In some embodiments, when the voltage value after compensation is fixed, the more severe the serial display, the longer the compensation time, for example, the compensation time may account for more than 50% of the pulse interval time T'. On the contrary, when the voltage value after compensation is fixed, the lighter the serial display, the shorter the compensation time, for example, the compensation time may account for less than 50% of the pulse interval time T'.

In some embodiments, as shown in FIG. 7, a voltage value V4 of the first clock signal CLK N+1 to N+6 after loading the level compensation within the pulse interval time T' is less than a voltage value V5, within the pulse interval time T', of at least one last second clock signal CLK N−5 to N within a display time period before the touch time period. Optionally, a difference (V4−V5) between the voltage value V4 of the first clock signal CLK N+1 to N+6 after loading the level compensation within the pulse interval time T' and the voltage value V5 of the second clock signal CLK N−5 to N within the pulse interval time T' is 10%-60% of a voltage value V6 of the first clock signal CLK N+1 to N+6 before compensation within the pulse interval time T', that is, a value of (V5−V4)/V6 is in a range from 10% to 60%. Generally, the voltage value V6 of the first clock signal CLK N+1 to N+6 before compensation within the pulse interval time T' may be equal to the voltage value V5 of the second clock signal CLK N−5 to N within the pulse interval time T', that is, V5=V6.

During specific implementation, the voltage value V4 of the first clock signal CLK N+1 to N+6 after compensation within the pulse interval time T' may be selected according to the severity degree of serial display and the length of the compensation time. In some embodiments, when the compensation time is fixed, the more severe the serial display, the smaller the voltage value V4 of the first clock signal CLK N+1 to N+6 after compensation within the pulse interval time T'. Correspondingly, an absolute value |V4−V5| of the difference value between the voltage value V4 of the first clock signal CLK N+1 to N+6 after compensation within the pulse interval time T' and the voltage value V5 of the second clock signal CLK N−5 to N within the pulse interval time T' is larger, for example, a value of (V4−V5)/V6 is in a range from 30% to 60%. On the contrary, when the compensation time is fixed, the smaller the serial display, the larger the voltage value V4 of the first clock signal CLK N+1 to N+6 after compensation within the pulse interval time T'. Correspondingly, the absolute value |V4−V5| of the difference value between the voltage value V4 of the first clock signal CLK N+1 to N+6 after compensation within the pulse interval time T' and the voltage value V5 of the second clock signal CLK N−5 to N within the pulse interval time T' is smaller, for example, the value of (V5−V4)/V6 is in a range from 10% to 30%.

In some embodiments, the value of the voltage value V4 of the first clock signal CLK N+1 to N+6 after compensation within the pulse interval time T' may be in a range from −4 V to −20 V. For example, the voltage value V6 (equal to the voltage value V5) of the first clock signal CLK N+1 to N+6 before loading the level compensation within the pulse interval time T' is-10 V, preferably, the voltage value V4 of the first clock signal CLK N+1 to N+6 after loading the level compensation within the pulse interval time T' is −15 V.

The above mode of loading the level compensation within the pulse interval time T' between the effective level pulses of the first clock signal CLK N+1 to N+6 may quickly pull down the falling edge of the effective level pulses contained in the first clock signal CLK N+1 to N+6, then timely pull down the level of the pull-up node PU through the bootstrap effect of the capacitor, and effectively avoids poor serial display by controlling the output transistor to be turned off in a timely mode through the PU node.

Figure 8:
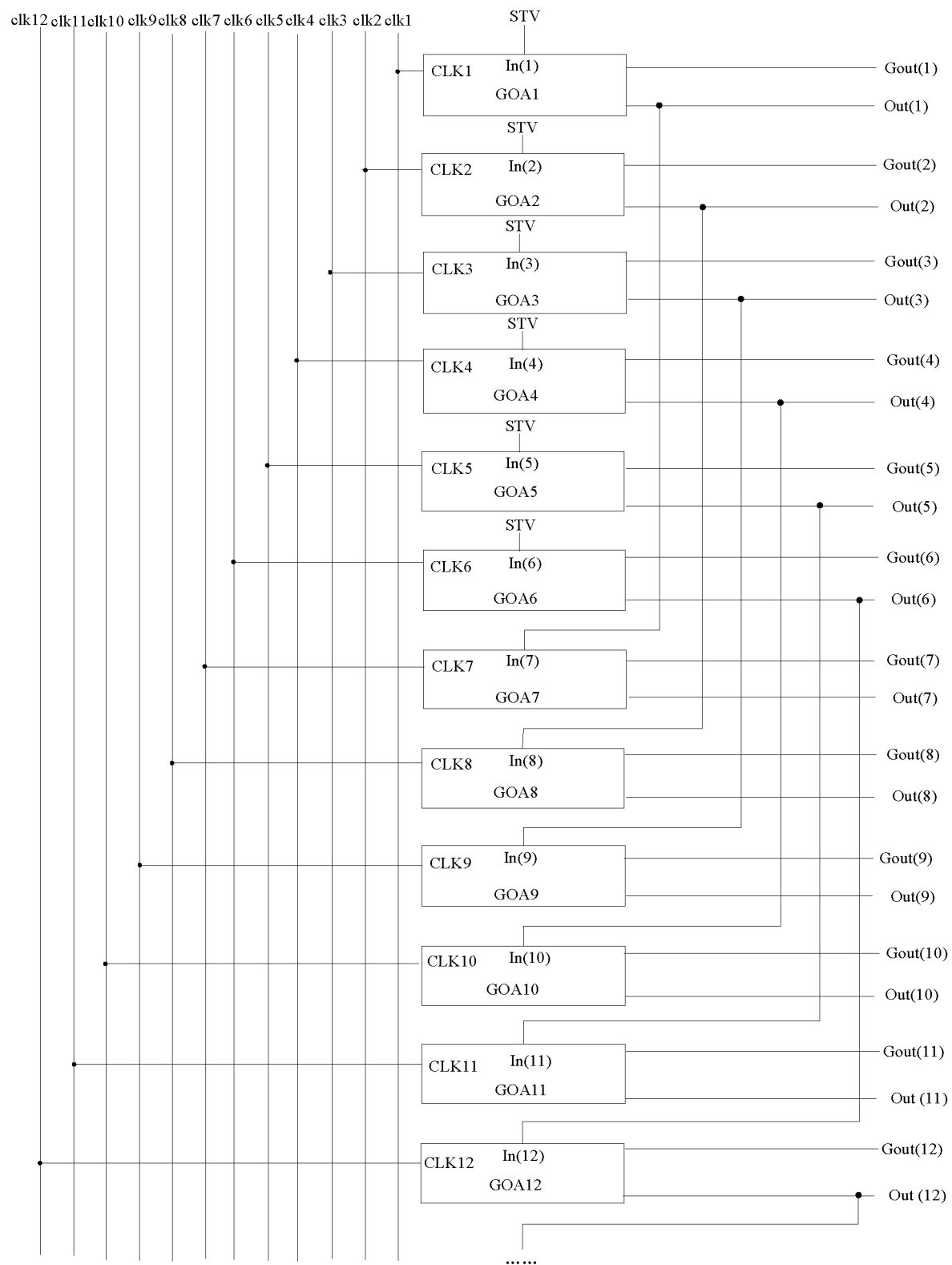
FIG. 8 is a schematic structural diagram of a gate drive circuit provided by embodiments of the present disclosure.

In some embodiments, in the above driving method provided by the embodiment of the present disclosure, as shown in FIG. 8, the gate drive circuit may include a plurality of shift registers GOAm (m is a positive integer) arranged in a cascade mode, input signal ends In (e.g., In(1) to In(6)) of a first stage of shift register to an $N^{th}$ stage of shift register are connected with a frame trigger signal end(s) STV, except for the first stage of shift register to the $N^{th}$ stage of shift register, input signal ends In(e.g., In(7) to In(12)) of the rest stages of shift registers are respectively connected with second output signal ends OutC (e.g., Out(1) to Out(6)) of shift registers with an N-stage interval thereon, a first output signal end Gout of each stage of shift register is correspondingly electrically connected with one gate line, every 2N stages of shift registers GOAm which are adjacent to one another are correspondingly electrically connected with 2N clock signal lines Clk respectively, and N is a positive integer.

Figure 9:
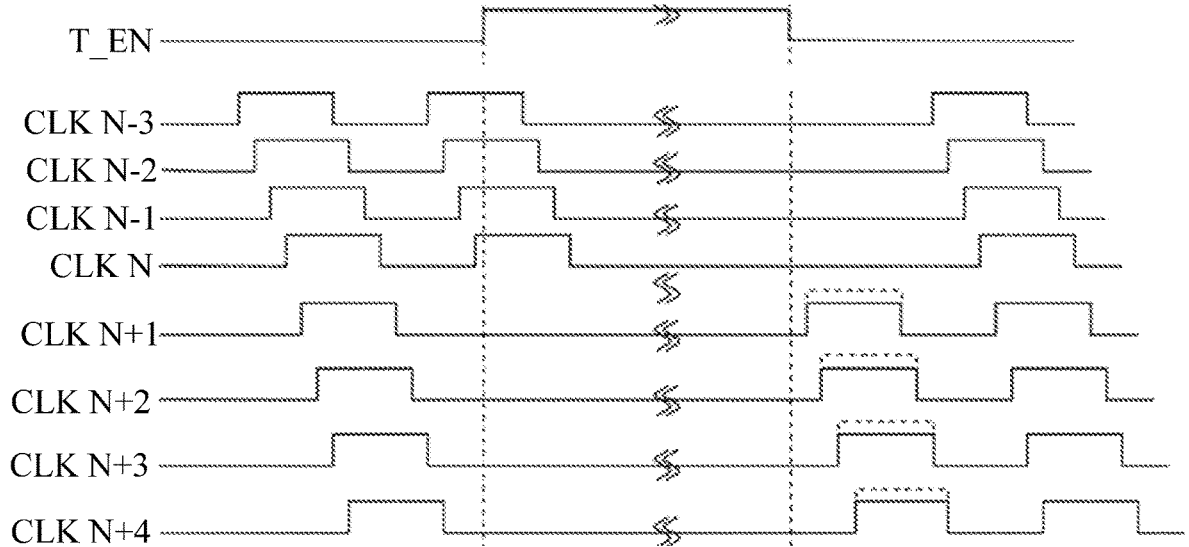
FIG. 9 is yet another schematic diagram of using a gate drive circuit to perform level compensation on a to-be-compensated gate line provided by embodiments of the present disclosure.

In each display time period, sequentially scanning the portion of corresponding gate lines may specifically include: in each display time period, sequentially scanning the gate lines corresponding to the different clock signal lines. In this case, since the output of an $m^{th}$ stage of shift register controls the input of an $(m+N)^{th}$ stage of shift register thereunder, it is necessary to compensate for the effective level pulses of the first N clock signal lines that start working after the touch time ends. In other words, loading the first clock signal containing level compensation onto the gate drive circuit may be specifically loading the first clock signal containing the level compensation onto the first N shift registers that start working through the first N clock signal lines (e.g., CLK N+1 to N+6 in FIG. 5 and CLK N+1 to N+4 in FIG. 9) that start working. Moreover, it should be understood that due to the different serial numbers of the first clock signal line that starts scanning after holding, the N clock signal lines that perform level compensation after each touch time period ends are not fixed.

Figure 10:
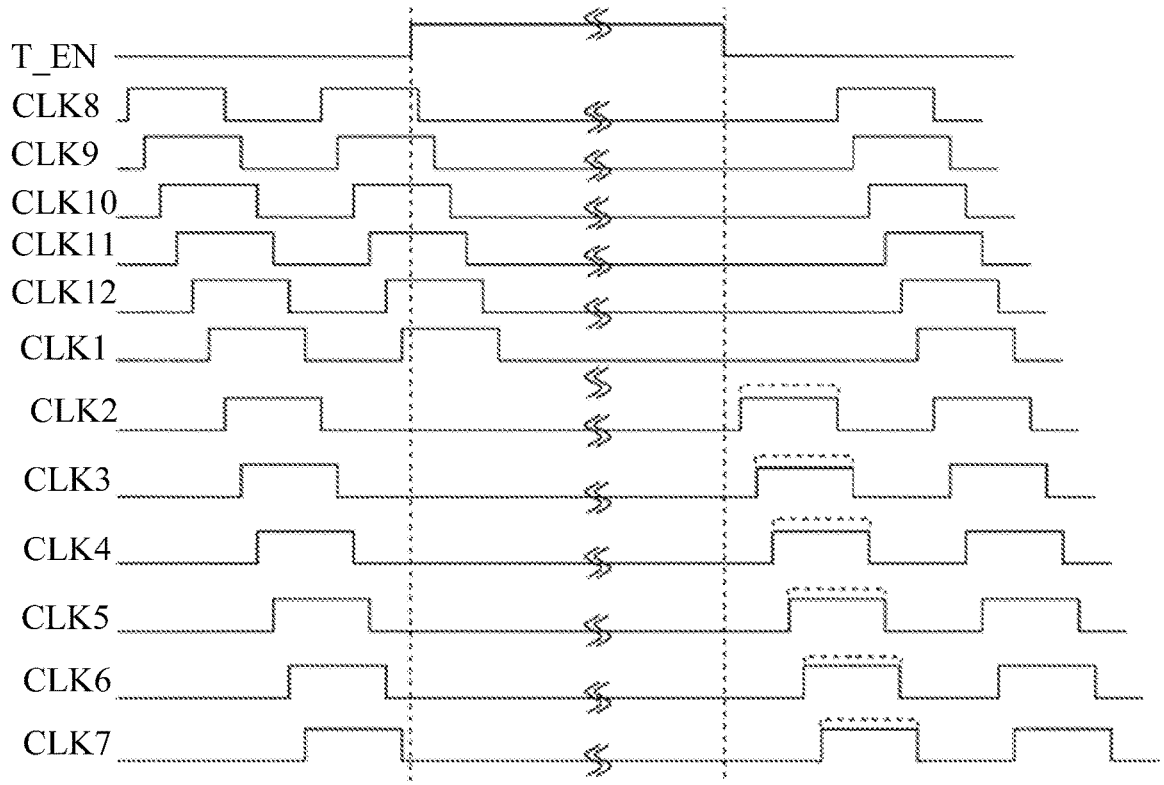
FIG. 10 is yet another schematic diagram of using a gate drive circuit to perform level compensation on a to-be-compensated gate line provided by embodiments of the present disclosure.

Optionally, it is further possible to sequentially scan in each display time period the gate line(s) corresponding to the same clock signal line. In this case, the clock signal containing the level compensation may be loaded onto the first N shift registers that start working through the N clock signal lines with fixed serial numbers. For example, as shown in FIG. 10, it is possible to hold each time scanning to the gate line corresponding to the first clock signal line Clk1. After the touch time period ends, it is necessary to perform level compensation on a second clock signal line Clk2 to a seventh clock signal line Clk7.

Figure 11:
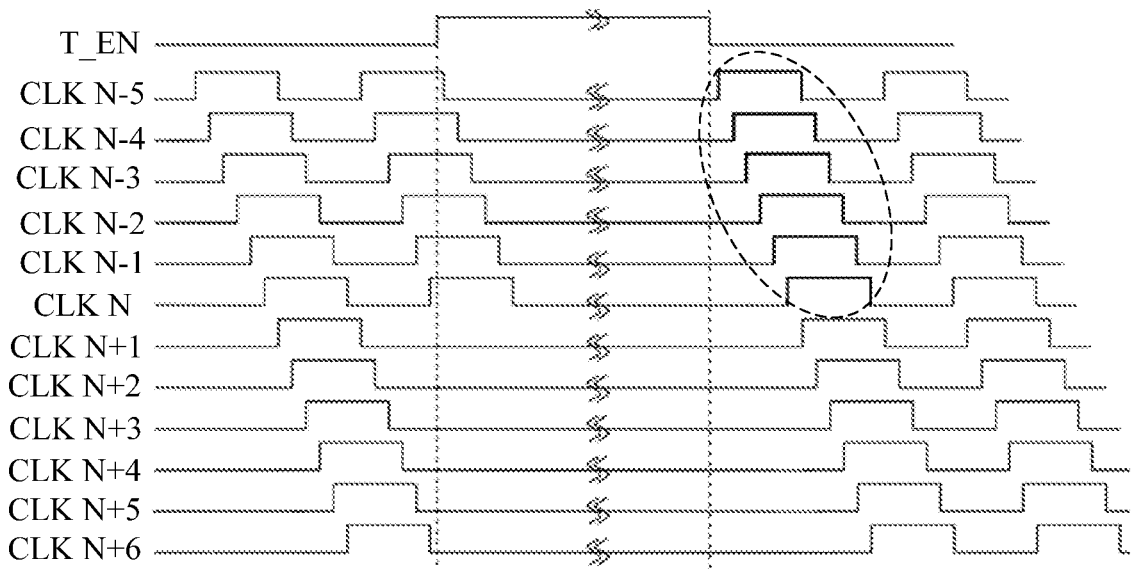
FIG. 11 is yet another schematic diagram of using a gate drive circuit to perform level compensation on a to-be-compensated gate line provided by embodiments of the present disclosure.

In some embodiments, in the above driving method provided in by the embodiment of the present disclosure, considering that the output of one shift register may affect the input of the cascaded shift register thereunder, it is possible to control the level of the pull-up node in the cascaded shift register thereunder, thereby eliminating the poor horizontal stripes caused by the electric leakage of the pull-up node. Therefore, as shown in FIG. 11, loading the first clock signal containing the level compensation onto the gate drive circuit may be specifically loading the first clock signal containing the level compensation onto the first N shift registers that start working through the N clock signal lines electrically and respectively connected with shift registers with which the first N shift registers that start working are upward cascaded. That is to say, through the clock signal lines of the first N shift registers that start working, the level of the pull-up node PU is normally pulled up. At the same time, the first clock signal containing the level compensation is loaded onto the first N shift registers that resume working first to achieve secondary charging to the pull-up node PU, thereby effectively eliminating the poor horizontal stripes caused by the electric leakage of the pull-up node PU. Specifically, FIG. 11 shows that the time when the gate line corresponding to the $N^{th}$ clock signal line ClkN is scanned is a time point at which the display time period ends. After the touch time period ends, the $(N-5)^{th}$ clock signal line Clk N-5 to the $N^{th}$ clock signal line Clk N repeatedly give a high level. In this way, secondary charging to the pull-up nodes PU in the shift registers corresponding to the $(N+1)^{th}$ clock signal line Clk N+1 to the $(N+6)^{th}$ clock signal line Clk N+6 may be achieved, so as to eliminate the poor horizontal stripes on the display images caused by the electric leakage of the pull-up node PU.

For COF products, due to entering the touch time period after the display is completed, pixel charging ends and then needs to be held for a period of time for touch recognition. The brightness of the display area (AA) decreases due to electric leakage of pixel circuits. After the touch control ends and enters the display time period, the brightness displayed after the pixel is charged is greater than the brightness displayed after the pixel is held for a period of time, resulting in horizontal stripes or poor blocks on the images.

Based on this, in the above driving method provided by the embodiment of the present disclosure, performing level compensation on the to-be-compensated gate line may be specifically providing a gate driving signal containing the level compensation for the to-be-compensated gate line through a chip on film.

Figure 12:
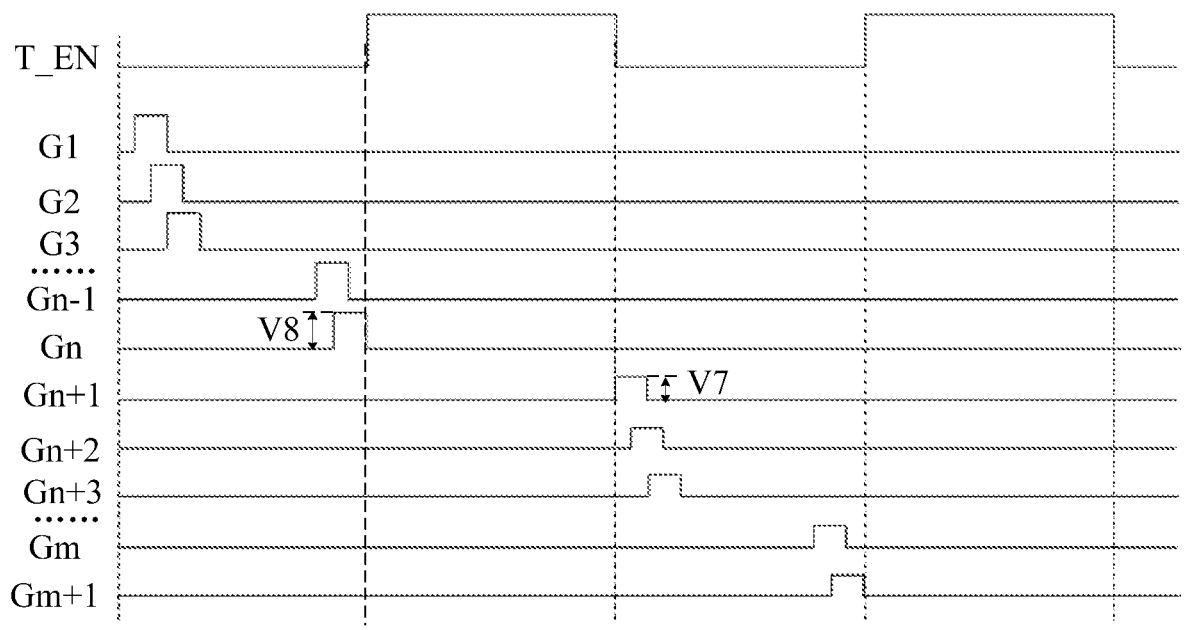
FIG. 12 is a schematic diagram of using a chip on film to perform level compensation on a to-be-compensated gate line provided by embodiments of the present disclosure.

In some embodiments, in the above driving method provided by the embodiment of the present disclosure, as shown in FIG. 12, providing the gate driving signal containing the level compensation for the to-be-compensated gate line through the chip on film may specifically be loading the level compensation within 1% to 100% of the pulse width time of the first effective level pulse provided by the chip on film, and using the first effective level pulse after the level compensation as the gate driving signal required for the to-be-compensated gate line (e.g., an $(n+1)^{th}$ gate line Gn+1 to an $(m+1)^{th}$ gate line Gm+1).

During specific implementation, the length of compensation time may be selected according to the severity degree of the horizontal stripes and the voltage value after compensation. In some embodiments, when the voltage value after compensation is fixed, the more severe the horizontal stripes, the longer the compensation time, for example, the compensation time may account for more than 50% of the pulse width time. On the contrary, when the voltage value after compensation is fixed, the lighter the horizontal stripes, the shorter the compensation time, for example, the compensation time may account for less than 50% of the pulse width time.

In some embodiments, as shown in FIG. 12, a voltage value V7 of the first effective level pulse provided by the chip on film for the to-be-compensated gate line (e.g., the gate line Gn+1 to m+1) after loading the level compensation is less than a voltage value V8 of at least one last second effective level pulse (e.g., which is provided to the gate line G1 to n) in the display time period before the touch time period. Optionally, a difference (V7−V8) between the voltage value V7 of the first effective level pulse after loading the level compensation and the voltage value V8 of the second effective level pulse (e.g., which is provided to the gate line G1 to n) is 1.25% to 20% of the voltage value (which is generally equal to voltage value V8) of the first effective level pulse (e.g., which is provided to the gate line Gn+1 to m+1) before compensation.

During specific implementation, the voltage value V7 of the first effective level pulse after compensation may be selected according to the severity degree of the horizontal stripes and the length of the compensation time. In some embodiments, when the compensation time is fixed, the more severe the horizontal stripes, the smaller the voltage value V7 of the first effective level pulse (e.g., which is provided to the gate line Gn+1 to m+1) after compensation. Correspondingly, the difference V8−V7 between the voltage value V8 of the second effective level pulse (e.g., which is provided to the gate line G1 to n) and the voltage value V7 of the first effective level pulse (e.g., which is provided to the gate line Gn+1 to m+1) after compensation is larger, for example, a value of (V8−V7)/V8 may be in a range from 10% to 20%. On the contrary, when the compensation time is fixed, the lighter the horizontal stripes, the smaller the voltage value V7 of the first effective level pulse (e.g., which is provided to the gate line Gn+1 to m+1). Correspondingly, the difference V8−V7 between the voltage value V8 of the second effective level pulse (e.g., which is provided to the gate line G1 to n) and the voltage value V7 of the first effective level pulse (e.g., which is provided to the gate line Gn+1 to m+1) after compensation is smaller, for example, the value of (V8−V7)/V8 may be in a range from 1.25% to 10%.

In some embodiments, the value of the voltage value V7 of the first effective level pulse provided by the chip on film for the to-be-compensated gate line (e.g., the gate line Gn+1 to m+1) after loading the level compensation may be in a range from 20 V to 40 V. For example, the voltage value V8 of the second effective level pulse (e.g., which is provided to the gate lines G1 to n) is 32 V, preferably, the voltage of the first effective level pulse provided by the chip on film for the to-be-compensated gate line (e.g., the gate line Gn+1 to m+1) after loading the level compensation is in a range from 28 V to 31.5 V.

Based on the same inventive concept, an embodiment of the present disclosure provides a display panel, driven by the above display method provided by the embodiment of the present disclosure. Optionally, the display panel may be a liquid crystal display panel. Principles of the display panel for solving the problems are similar to those of the above driving method, therefore, implementation of the display panel provided by the embodiment of the present disclosure may refer to that of the above driving method provided by the embodiment of the present disclosure, and repetitions are omitted.

Figure 13:
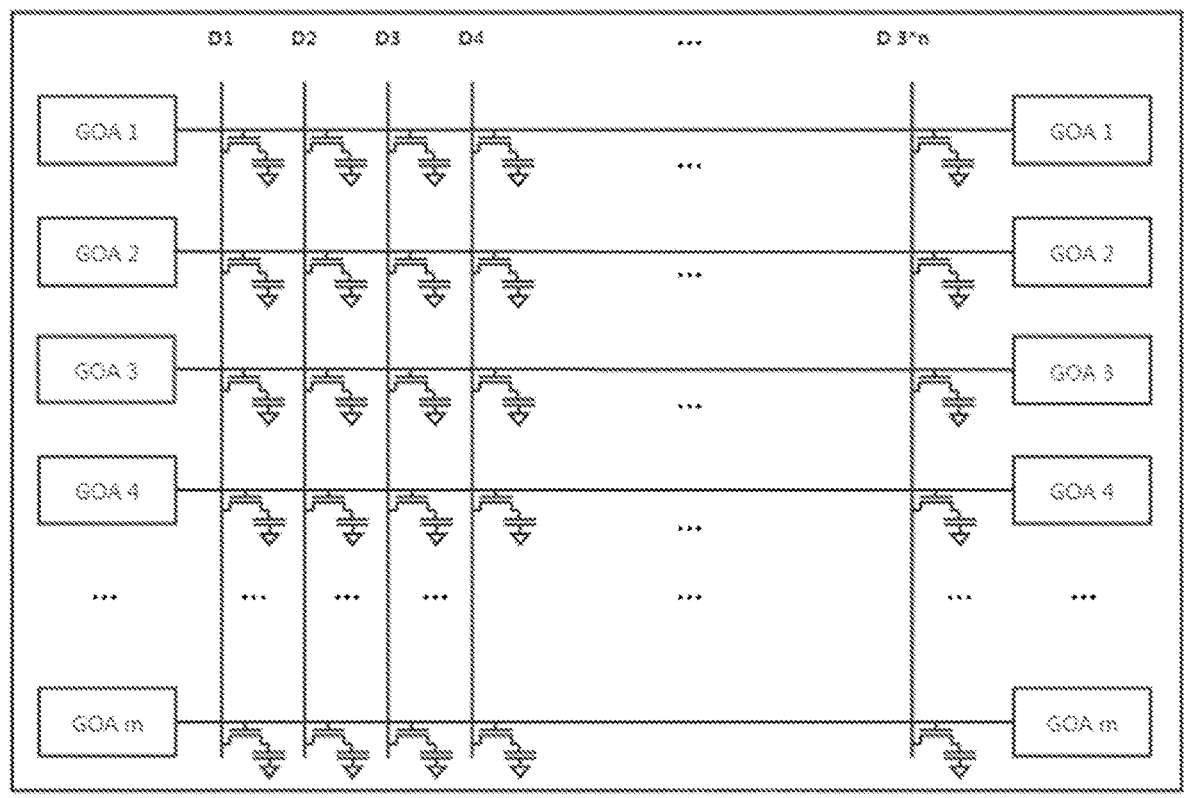
FIG. 13 is a schematic structural diagram of a display panel containing a gate drive circuit provided by embodiments of the present disclosure.

In some embodiments, as shown in FIG. 8 and FIG. 13, the above driving panel provided by the embodiment of the present disclosure may include the gate drive circuit, the plurality of gate lines, and 2N clock signal lines, wherein the gate drive circuit includes the plurality of shift registers GOAm (m is a positive integer) arranged in a cascade mode, input signal ends In of a first stage of shift register to an $N^{th}$ stage of shift register are connected with a frame trigger signal end(s) STV, except for the first stage of shift register to the $N^{th}$ stage of shift register, input signal ends In of the rest stages of shift registers are respectively connected with second output signal ends OutC of shift registers with an N-stage interval thereon, a first output signal end Gout of each stage of shift register is correspondingly electrically connected with one gate line, 2N stages of shift registers GOAm which are adjacent to one another are correspondingly electrically connected with 2N clock signal lines Clk respectively, and N is a positive integer.

Figure 14:
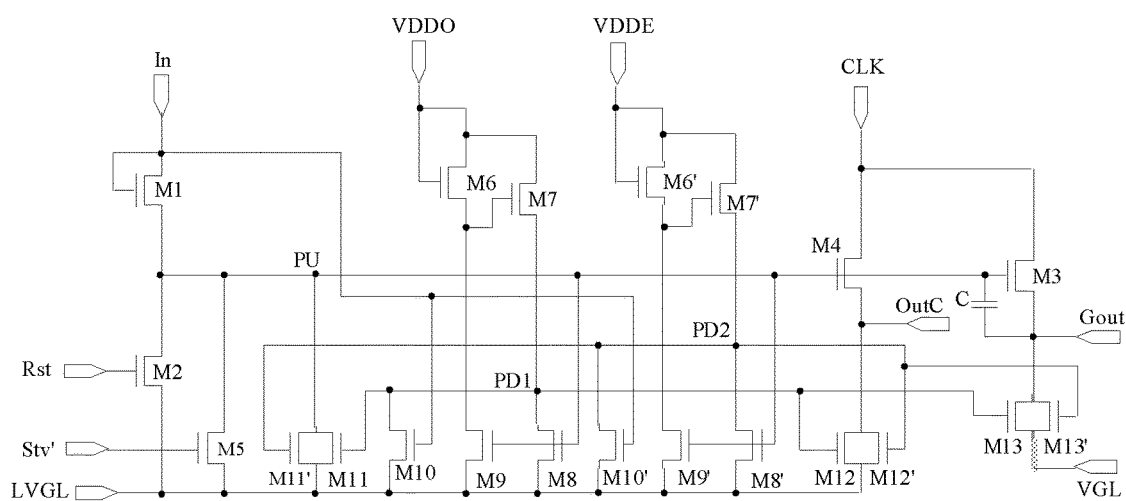
FIG. 14 is a schematic structural diagram of a shift register in FIG. 8 and FIG. 13.

In some embodiments, as shown in FIG. 14, the shift register provided by the embodiment of the present disclosure may include: an input transistor M1, a reset transistor M2, a first output transistor M3, a second output transistor M4, a capacitor C, and a control circuit; a gate electrode and a first electrode of each input transistor M1 are electrically connected with an input signal end In, and a second electrode of each input transistor M1 is electrically connected with a pull-up node PU; a gate electrode of each reset transistor M2 is electrically connected with a reset signal end Rst, a first electrode of each reset transistor M2 is electrically connected with a low-level power supply end LVGL, and a second electrode of each reset transistor M2 is electrically connected with the pull-up node PU; a gate electrode of each first output transistor M3 is electrically connected with the pull-up node PU, a first electrode of each first output transistor M3 is electrically connected with a clock signal line Clk, a second electrode of each first output transistor M3 is electrically connected with a first output signal end Gout, and the first output signal end Gout is electrically connected with the gate line; the capacitor C is connected between the gate electrode of the first output transistors M3 and the first output signal end Gout; a gate electrode of each second output transistor M4 is electrically connected with the pull-up node PU, a first electrode of each second output transistor M4 is electrically connected with the clock signal line Clk, a second electrode of each second output transistor M4 is electrically connected with a second output signal end OutC, and the second output signal end OutC is electrically connected with an input signal end In of a shift register with an N-level interval thereunder; and the control circuit is electrically connected with the pull-up node PU, the first output signal end Gout, the second output signal end OutC and a control signal end respectively, and the control circuit is configured to control levels of the pull-up node PU, the first output signal end Gout and the second output signal end OutC in response to a signal of the control signal end.

Optionally, the control circuit may include a fifth transistor M5, and a sixth transistor M6/M6' to a thirteenth transistor M13/M13'. The control signal end may include a reset signal end STV', an input signal end In, and a high-level power supply end VDDO/VDDE. In a pull-down phase, the high-level power supply end VDDO and the high-level power supply end VDDE work alternately, and the sixth transistor M6 to the thirteenth transistor M13 as well as the sixth transistor M6' to the thirteenth transistor M13' work alternately. In other words, the sixth transistor M6 to the thirteenth transistor M13 work during half of the pull-down phase under the control of the high-level power supply end VDDO, the sixth transistor M6' to the thirteenth transistors M13' work during the other half of the pull-down phase under the control of the high-level power supply end VDDE, thereby prolonging the service life of the sixth transistor M6/M6' to the thirteenth transistor M13/M13'. At the beginning of one time frame, the fifth transistor M5 resets the pull-up nodes PU of all the shift registers under the control of the reset signal end STV'.

Figure 15:
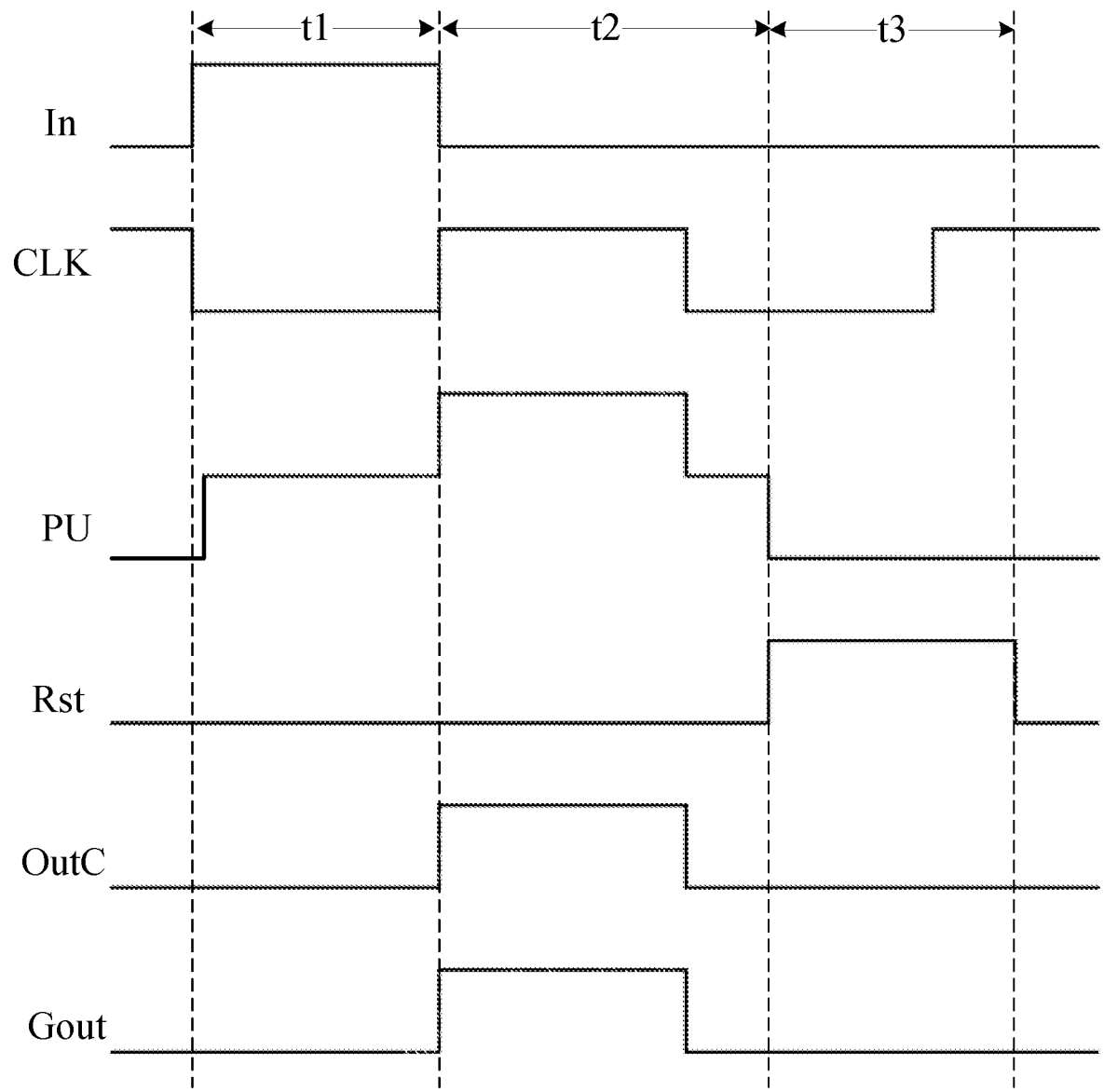
FIG. 15 is a working timing diagram of a shift register shown in FIG. 14.
Figure 16:
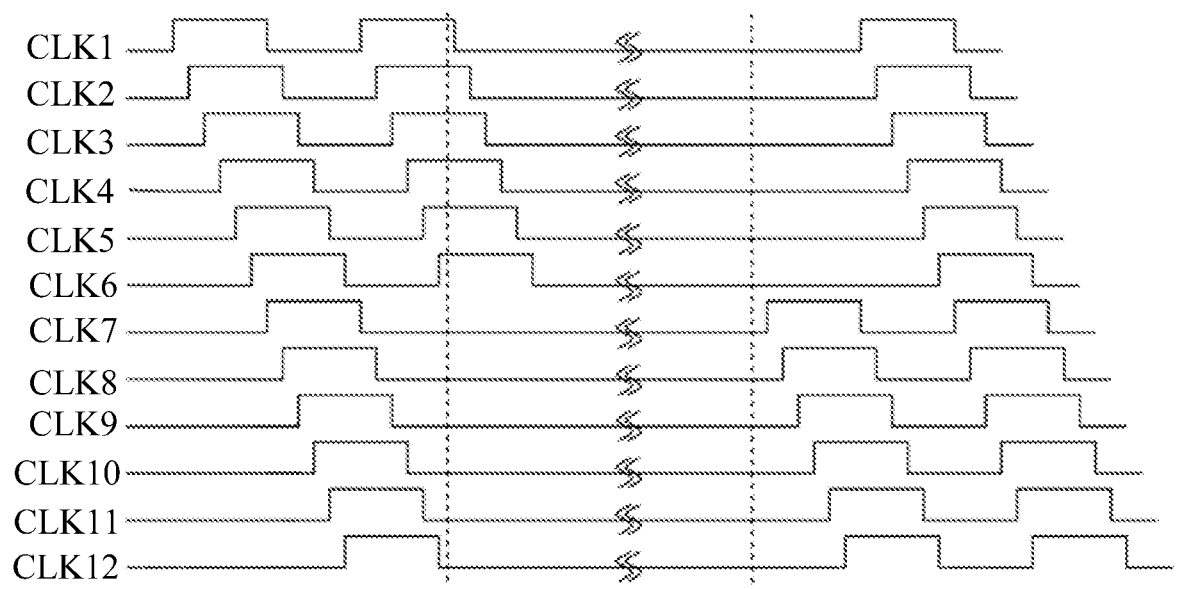
FIG. 16 is a working timing diagram of each clock signal line shown in FIG. 8.

Taking a structure of the shift register shown in FIG. 8 and FIG. 14 as an example, combined with working timing diagrams shown in FIG. 15 and FIG. 16, a working process of the shift register will be briefly explained below.

First, the fifth transistor M5 resets the pull-up nodes PU of all the shift registers under the control of the reset signal end STV'. Afterwards, taking the first stage of shift register as an example: in an input phase t1, the frame trigger signal end STV loads a signal for the input signal end In(1) to turn on the first transistor M1, an eighth transistor M8, a ninth transistor M9, and a tenth transistor M10, wherein, the level of the pull-up node PU of the first stage of shift register GOA1 is pulled up by the first transistor M1, a level of a pull-down node PD1 is pulled down by the eighth transistor M8 and the tenth transistor M10, and a level of the gate electrode of the seventh transistor M7 is pulled down by the ninth transistor M9.

In an output phase t2, the clock signal loaded on the first clock signal line Clk1 is at a high level. Due to a bootstrap effect of the capacitor C, the level of the pull-up node PU is further pulled up. The high-level pull-up node PU turns on the first output transistor M3 and the second output transistor M4, such that the first output signal end Gout(1) and the second output signal end Out (1) output a high level. The high level of the first output signal end Gout(1) is provided to the corresponding gate line as the gate driving signal, and the high level of the second output signal end Out(1) is provided to the input signal end In(7) of the seventh phase of shift register GOA7.

In a reset phase t3, the reset transistor M2 of the first stage of shift register GOA1 is turned on to pull down the level of the pull-up node PU; and a sixth transistor T6 and a seventh transistor T7 are turned on to pull up the level of the pull-down node PD1, such that the eleventh transistor T11, the twelfth transistor M12, and the thirteenth transistor M13 are turned on to respectively pull down the levels of the pull-up node PU, the second output signal end Out(1), and the first output signal end Gout(1).

In some embodiments, the above display panel provided by the embodiment of the present disclosure may include a chip on film and a plurality of gate lines, and the chip on film includes a plurality of terminals correspondingly electrically connected with the gate lines, respectively, so as to provide the gate driving signals for the gate lines through the terminals of the chip on film.

Based on the same inventive concept, an embodiment of the present disclosure provides a display device, including the above display panel provided by the embodiment of the present disclosure. Principles of the display device for solving the problems are similar to those of the above display panel, therefore, implementation of the display device provided by the embodiment of the present disclosure may refer to that of the above display panel, and repetitions are omitted.

In some embodiments, the display device may be: any product or component with a display function, such as a mobile phone, a tablet computer, a television, a displayer, a notebook computer, a digital photo frame, a navigator, a smart watch, a fitness wristband and a personal digital assistant. The display device includes but not limited to: a radio frequency unit, a network module, an audio output and input unit, a sensor, a display unit, a user input unit, an interface unit, a memory, a processor, a power supply and other components. In addition, those skilled in the art can understand that the above structure does not constitute a limitation to the above display device provided by the embodiment of the present disclosure. In other words, the above display device provided by the embodiment of the present disclosure may include more or fewer above components, or combine some components, or different component arrangements.

Apparently, those skilled in the art can make various modifications and variations to the embodiments of the present disclosure without departing from the spirit and scope of the embodiments of the present disclosure. In this way, if these modifications and variations of the embodiments of the present disclosure fall within the scope of the claims of the present disclosure and their equivalent art, the present disclosure also intends to include these modifications and variations.

What is claimed is:

1. A driving method for a display panel, wherein one time frame comprises at least two display time periods and at least one touch time period which are alternately configured, and the method comprises:
in each display time period, sequentially scanning a portion of gate lines in the display panel; and
in each touch time period, holding the scanning for all the gate lines and performing touch recognition, wherein in a display time period which follows and is adjacent to a touch time period, level compensation is performed on a to-be-compensated gate line, and the to-be-compensated gate line is at least one gate line that starts to be scanned in the display time period which follows and is adjacent to the touch time period;
wherein the performing the level compensation on the to-be-compensated gate line comprises:
providing a gate driving signal containing level compensation for the to-be-compensated gate line through a gate drive circuit;
wherein the providing the gate driving signal containing the level compensation for the to-be-compensated gate line through the gate drive circuit comprises:
loading a first clock signal containing the level compensation onto the gate drive circuit to cause that the gate drive circuit generates the gate driving signal containing the level compensation according to the first clock signal containing the level compensation.

2. The driving method according to claim 1, wherein the loading the first clock signal containing the level compensation onto the gate drive circuit comprises:
loading the level compensation onto the gate drive circuit within 1% to 100% of a pulse width time of an effective level pulse of the first clock signal, and providing the first clock signal after loading the level compensation to the gate drive circuit.

3. The driving method according to claim 2, wherein a voltage value of the effective level pulse of the first clock signal after loading the level compensation is greater than a voltage value of an effective level pulse of at least one last second clock signal within a display time period before the touch time period.

4. The driving method according to claim 3, wherein a difference between the voltage value of the effective level pulse of the first clock signal after loading the level compensation and the voltage value of the effective level pulse of the second clock signal is 0.25% to 7.5% of a voltage value of the effective level pulse of the first clock signal before loading the level compensation.

5. The driving method according to claim 4, wherein the voltage value of the effective level pulse of the first clock signal after loading the level compensation is between 27 V and 40 V.

6. The driving method according to claim 1, wherein the loading the first clock signal containing the level compensation onto the gate drive circuit comprises:
loading the level compensation onto the gate drive circuit within 1% to 100% of a pulse interval time between effective level pulses of the first clock signal, and providing the first clock signal after loading the level compensation to the gate drive circuit.

7. The driving method according to claim 6, wherein a voltage value of the first clock signal after loading the level compensation within the pulse interval time is less than a voltage value, within the pulse interval time, of at least one last second clock signal within a display time period before the touch time period.

8. The driving method according to claim 7, wherein a difference between the voltage value of the first clock signal after loading the level compensation within the pulse interval time and the voltage value of the second clock signal within the pulse interval time is 10% to 60% of a voltage value of the first clock signal before loading the level compensation within the pulse interval time.

9. The driving method according to claim 8, wherein the voltage value of the first clock signal after loading the level compensation within the pulse interval time is between −4 V and −20 V.

10. The driving method according to claim 1, wherein the gate drive circuit comprises a plurality of shift registers arranged in a cascade mode, input signal ends of a first stage of shift register to an $N^{th}$ stage of shift register are connected with a frame trigger signal end, except for the first stage of shift register to the $N^{th}$ stage of shift register, input signal ends of the rest stages of shift registers are respectively connected with second output signal ends of shift registers with an N-stage interval thereon, a first output signal end of each stage of shift register is correspondingly electrically connected with one gate line, 2N stages of shift registers which are adjacent to one another are correspondingly electrically connected with 2N clock signal lines respectively, and N is a positive integer; and in each display time period, sequentially scanning the portion of corresponding gate lines comprises:

in each display time period, sequentially scanning the gate lines corresponding to the different clock signal lines.

11. The driving method according to claim 10, wherein the loading the first clock signal containing the level compensation onto the gate drive circuit comprises:

loading the first clock signal containing the level compensation onto the first N shift registers that start working through the first N clock signal lines that start working.

12. The driving method according to claim 10, wherein the loading the first clock signal containing the level compensation onto the gate drive circuit comprises:

loading the first clock signal containing the level compensation onto the first N shift registers that start working through N clock signal lines electrically and respectively connected with shift registers with which the first N shift registers that start working are upward cascaded.

13. The driving method according to claim 1, wherein the gate drive circuit comprises a plurality of shift registers arranged in a cascade mode, input signal ends of a first stage of shift register to an $N^{th}$ stage of shift register are connected with a frame trigger signal end, except for the first stage of shift register to the $N^{th}$ stage of shift register, input signal ends of the rest stages of shift registers are respectively connected with second output signal ends of shift registers with an N-stage interval thereon, a first output signal end of each stage of shift register is correspondingly electrically connected with one gate line, 2N stages of shift registers which are adjacent to one another is correspondingly electrically connected with 2N clock signal lines respectively, and N is a positive integer; and in each display time period, sequentially scanning the portion of corresponding gate lines comprises:

in each display time period, sequentially scanning the gate line corresponding to the same clock signal line.

14. The driving method according to claim 13, wherein the loading the first clock signal containing the level compensation onto the gate drive circuit comprises:

loading the first clock signal containing the level compensation onto the first N shift registers that start working through N clock signal lines with fixed serial numbers.

15. The driving method according to claim 1, wherein the performing the level compensation on the to-be-compensated gate line comprises:

providing a gate driving signal containing level compensation for the to-be-compensated gate line through a chip on film.

16. The driving method according to claim 15, wherein the providing the gate driving signal containing the level compensation for the to-be-compensated gate line through the chip on film comprises:

loading the level compensation within 1% to 100% of a pulse width time of a first effective level pulse provided by the chip on film, and using the first effective level pulse after the level compensation as the gate driving signal.

17. The driving method according to claim 16, wherein a voltage value of the first effective level pulse after loading the level compensation is less than a voltage value of at least one last second effective level pulse within a display time period before the touch time period.

18. The driving method according to claim 16, wherein a difference between the voltage value of the second effective level pulse and the voltage value of the first effective level pulse after loading the level compensation is 1.25% to 20% of a voltage value of the first effective level pulse before loading the level compensation.

19. The driving method according to claim 18, wherein the voltage value of the first effective level pulse after loading the level compensation is between 20 V and 40 V.

20. A display panel, driven by using the driving method according to claim 1.

* * * * *